(12) United States Patent
Pourfallah et al.

(10) Patent No.: US 8,660,855 B2
(45) Date of Patent: Feb. 25, 2014

(54) SYSTEM AND METHOD USING EXTENDED AUTHORIZATION HOLD PERIOD

(75) Inventors: Stacy Pourfallah, Oakland, CA (US); Janet Pruitt, Mill Valley, CA (US); Douglas Frantz, San Francisco, CA (US); Roxanna Kayoumi, San Mateo, CA (US)

(73) Assignee: VISA U.S.A. Inc., San Francisco, CA (US)

( * ) Notice: Subject to any disclaimer, the term of this patent is extended or adjusted under 35 U.S.C. 154(b) by 1284 days.

(21) Appl. No.: 11/760,244

(22) Filed: Jun. 8, 2007
(Under 37 CFR 1.47)

(65) Prior Publication Data
US 2008/0140447 A1    Jun. 12, 2008

Related U.S. Application Data

(60) Provisional application No. 60/812,266, filed on Jun. 8, 2006.

(51) Int. Cl.
*G06Q 50/00*   (2012.01)
*G06Q 10/00*   (2012.01)

(52) U.S. Cl.
USPC .................................................. 705/2; 705/3

(58) Field of Classification Search
USPC ............................................................ 705/2
See application file for complete search history.

(56) References Cited

U.S. PATENT DOCUMENTS

| | | | |
|---|---|---|---|
| 4,491,725 A | * | 1/1985 | Pritchard ........................... 705/2 |
| 5,018,067 A | | 5/1991 | Mohlenbrock et al. |
| 5,070,452 A | | 12/1991 | Doyle, Jr. et al. |
| 5,175,416 A | | 12/1992 | Mansvelt et al. |
| 5,235,507 A | | 8/1993 | Sackler et al. |
| 5,301,105 A | | 4/1994 | Cummings, Jr. |

(Continued)

FOREIGN PATENT DOCUMENTS

| | | |
|---|---|---|
| AU | 2006203957 | 3/2012 |
| AU | 2006203968 | 3/2012 |

(Continued)

OTHER PUBLICATIONS

"Welcome to American Express Healthpay Plus Works, What is Pay Plus" downloaded on www.152.americanexpress.com/encampweb/payment_technologies/epay_how_it_works.jsp.*

(Continued)

*Primary Examiner* — Tran Nguyen
(74) *Attorney, Agent, or Firm* — Loeb & Loeb LLP

(57) ABSTRACT

Embodiments of the present invention relate to methods and apparatuses serving to provide assurance that healthcare providers will receive payment for services rendered. In one embodiment, a payment card (or other portable consumer device) provides an extended authorization hold period (for example up to 21 days). This hold period allows the healthcare provider to request authorization for payment from the patient's credit, debit, FSA, HRA, or HSA payment card, submit the insurance claim, and then upon receipt of a health insurance carrier's Explanation of Benefits (EOB) within the hold period, submit for settlement only that amount actually due from the patient. In accordance with an alternative embodiment, pending receipt of the EOB from the insurer, the healthcare provider flags a transaction in a point-of-sale (POS) terminal device or server for storage and delayed submittal over an electronic payment network. Embodiments in accordance with the present invention are particularly applicable to payment of claims in healthcare plans following adjudication by a payer.

19 Claims, 6 Drawing Sheets

(56) References Cited

U.S. PATENT DOCUMENTS

| | | |
|---|---|---|
| 5,324,077 A | 6/1994 | Kessler et al. |
| 5,335,278 A | 8/1994 | Matchett et al. |
| 5,550,734 A * | 8/1996 | Tarter et al. ............... 705/2 |
| 5,628,530 A | 5/1997 | Thornton |
| 5,644,778 A | 7/1997 | Burks et al. |
| 5,710,578 A | 1/1998 | Beauregard et al. |
| 5,832,447 A | 11/1998 | Rieker et al. |
| 5,915,241 A | 6/1999 | Giannini |
| 5,965,860 A | 10/1999 | Oneda |
| 5,995,939 A | 11/1999 | Berman et al. |
| 6,012,035 A | 1/2000 | Freeman, Jr. et al. |
| 6,044,352 A | 3/2000 | Deavers |
| 6,082,776 A | 7/2000 | Feinberg |
| 6,112,183 A | 8/2000 | Swanson et al. |
| 6,151,588 A | 11/2000 | Tozzoli et al. |
| 6,208,973 B1 | 3/2001 | Boyer et al. |
| 6,332,133 B1 | 12/2001 | Takayama |
| 6,343,271 B1 | 1/2002 | Peterson et al. |
| 6,401,079 B1 | 6/2002 | Kahn et al. |
| 6,529,884 B1 | 3/2003 | Jakobsson |
| 6,629,081 B1 | 9/2003 | Cornelius et al. |
| 6,850,901 B1 | 2/2005 | Hunter et al. |
| 6,877,655 B1 | 4/2005 | Robertson et al. |
| 6,915,265 B1 | 7/2005 | Johnson |
| 6,988,075 B1 | 1/2006 | Hacker |
| 7,072,842 B2 | 7/2006 | Provost et al. |
| 7,133,840 B1 * | 11/2006 | Kenna et al. ............... 705/35 |
| 7,174,302 B2 | 2/2007 | Patricelli et al. |
| 7,295,988 B1 | 11/2007 | Reeves |
| 7,428,494 B2 | 9/2008 | Hasan et al. |
| 7,650,308 B2 | 1/2010 | Nguyen et al. |
| 7,752,096 B2 * | 7/2010 | Santalo et al. ............... 705/34 |
| 7,769,599 B2 | 8/2010 | Yanak et al. |
| 7,792,688 B2 | 9/2010 | Yanak et al. |
| 7,866,548 B2 | 1/2011 | Reed et al. |
| 7,925,518 B2 | 4/2011 | Lee et al. |
| 7,996,260 B1 | 8/2011 | Cunningham et al. |
| 2001/0037295 A1 | 11/2001 | Olsen |
| 2001/0053986 A1 | 12/2001 | Dick |
| 2002/0002534 A1 | 1/2002 | Davis et al. |
| 2002/0002536 A1 | 1/2002 | Braco |
| 2002/0019808 A1 | 2/2002 | Sharma |
| 2002/0032583 A1 | 3/2002 | Joao |
| 2002/0128863 A1 | 9/2002 | Richmond |
| 2002/0138309 A1 | 9/2002 | Thomas, Jr. |
| 2002/0147678 A1 | 10/2002 | Drunsic |
| 2002/0152180 A1 | 10/2002 | Turgeon |
| 2002/0198831 A1 | 12/2002 | Patricelli et al. |
| 2003/0009355 A1 | 1/2003 | Gupta |
| 2003/0040939 A1 | 2/2003 | Tritch et al. |
| 2003/0055686 A1 | 3/2003 | Satoh et al. |
| 2003/0193185 A1 | 10/2003 | Valley et al. |
| 2003/0200118 A1 * | 10/2003 | Lee et al. ............... 705/2 |
| 2003/0212642 A1 | 11/2003 | Weller et al. |
| 2003/0225693 A1 | 12/2003 | Ballard et al. |
| 2004/0006490 A1 | 1/2004 | Gingrich et al. |
| 2004/0039693 A1 | 2/2004 | Nauman et al. |
| 2004/0054935 A1 | 3/2004 | Holvey et al. |
| 2004/0064386 A1 * | 4/2004 | Goguen et al. ............... 705/34 |
| 2004/0103000 A1 | 5/2004 | Owurowa et al. |
| 2004/0111345 A1 | 6/2004 | Chuang et al. |
| 2004/0128201 A1 | 7/2004 | Ofir et al. |
| 2004/0138999 A1 | 7/2004 | Friedman et al. |
| 2004/0148203 A1 | 7/2004 | Whitaker et al. |
| 2004/0172312 A1 | 9/2004 | Selwanes et al. |
| 2004/0186746 A1 | 9/2004 | Angst et al. |
| 2004/0210520 A1 | 10/2004 | Fitzgerald et al. |
| 2004/0225567 A1 | 11/2004 | Mitchell et al. |
| 2004/0254816 A1 | 12/2004 | Myers |
| 2005/0010448 A1 | 1/2005 | Mattera |
| 2005/0015280 A1 | 1/2005 | Gabel et al. |
| 2005/0033609 A1 | 2/2005 | Yang |
| 2005/0038675 A1 | 2/2005 | Siekman et al. |
| 2005/0065819 A1 | 3/2005 | Schultz |
| 2005/0065824 A1 | 3/2005 | Kohan |
| 2005/0071194 A1 | 3/2005 | Bormann et al. |
| 2005/0119918 A1 | 6/2005 | Berliner |
| 2005/0182721 A1 | 8/2005 | Weintraub |
| 2005/0187790 A1 | 8/2005 | Lapsker |
| 2005/0187794 A1 | 8/2005 | Kimak |
| 2005/0209893 A1 | 9/2005 | Nahra et al. |
| 2005/0211764 A1 | 9/2005 | Barcelou |
| 2005/0246292 A1 | 11/2005 | Sarcanin |
| 2005/0273387 A1 | 12/2005 | Previdi |
| 2005/0288964 A1 | 12/2005 | Lutzen et al. |
| 2006/0010007 A1 | 1/2006 | Denman et al. |
| 2006/0106645 A1 | 5/2006 | Bergelson et al. |
| 2006/0106646 A1 | 5/2006 | Squilla et al. |
| 2006/0111943 A1 | 5/2006 | Wu |
| 2006/0129427 A1 | 6/2006 | Wennberg |
| 2006/0129435 A1 | 6/2006 | Smitherman et al. |
| 2006/0136270 A1 | 6/2006 | Morgan et al. |
| 2006/0149529 A1 | 7/2006 | Nguyen et al. |
| 2006/0149603 A1 | 7/2006 | Patterson et al. |
| 2006/0149670 A1 | 7/2006 | Nguyen et al. |
| 2006/0161456 A1 | 7/2006 | Baker et al. |
| 2006/0173712 A1 | 8/2006 | Joubert |
| 2006/0184455 A1 | 8/2006 | Meyer et al. |
| 2006/0206361 A1 | 9/2006 | Logan, Jr. |
| 2006/0224417 A1 | 10/2006 | Werner |
| 2006/0229911 A1 | 10/2006 | Gropper et al. |
| 2006/0235761 A1 | 10/2006 | Johnson |
| 2007/0005403 A1 | 1/2007 | Kennedy et al. |
| 2007/0027715 A1 | 2/2007 | Gropper et al. |
| 2007/0061169 A1 | 3/2007 | Lorsch |
| 2007/0106607 A1 | 5/2007 | Seib et al. |
| 2007/0125844 A1 | 6/2007 | Libin et al. |
| 2007/0143215 A1 | 6/2007 | Willems |
| 2007/0282637 A1 | 12/2007 | Smith |
| 2008/0010096 A1 | 1/2008 | Patterson et al. |
| 2008/0071646 A1 | 3/2008 | Hodson et al. |
| 2008/0140447 A1 | 6/2008 | Pourfallah et al. |
| 2008/0147518 A1 | 6/2008 | Haider et al. |
| 2008/0177574 A1 | 7/2008 | Gonzalez et al. |
| 2008/0319904 A1 | 12/2008 | Carlson et al. |
| 2009/0006203 A1 | 1/2009 | Fordyce, III et al. |
| 2010/0100484 A1 | 4/2010 | Nguyen et al. |
| 2010/0332251 A1 | 12/2010 | Yanak et al. |
| 2011/0178816 A1 | 7/2011 | Lee et al. |

FOREIGN PATENT DOCUMENTS

| | | |
|---|---|---|
| EP | 1834275 | 9/2007 |
| EP | 1834314 | 9/2007 |
| EP | 1856663 | 11/2007 |
| EP | 2030163 | 3/2009 |
| EP | 2035990 | 3/2009 |
| HK | 1107164 | 3/2008 |
| HK | 1107172 | 3/2008 |
| HK | 1108752 | 5/2008 |
| JP | 2005124991 | 5/2005 |
| JP | 2008545210 | 12/2008 |
| JP | 2009541864 | 11/2009 |
| KR | 1020040028017 | 4/2004 |
| KR | 1020050099707 | 10/2005 |
| KR | 1020050094938 | 7/2006 |
| KR | 1020070041183 | 4/2007 |
| WO | WO99/22330 | 5/1999 |
| WO | WO01/06468 | 1/2001 |
| WO | WO03/073353 | 9/2003 |
| WO | WO2006/074285 | 7/2006 |

OTHER PUBLICATIONS

Companion Guide 835 Health Care Claim Payment/Advice, Convansys, Jun. 24, 2004 XP002564865 http://www.njelkids.com/UL/pdf/NJ_835v1_20040820-2.pdf.

Hammond, W Edward and Cimino, James "Standards in Medical Informatics: Computer Applications in Health Care and Biomedicine," 2000 Springer, NY XP002564866, pp. 226-276.

Classen, David et al.; "The Patient safety Insitute demonstration Project: A Model for Implementing a Local Health information Infrastructure"; 2004, Journal of Healthcare Information Management, vol. 19, No. 4, pp. 75-86.

(56) References Cited

OTHER PUBLICATIONS

"Patient Safety Institute: Economic Value of a Community Clinical Information Sharing Network, Part 1: Value to Payers (Private, Medicare, Medicaid and self-Insured Employers) and the Uninsured"; White Paper prepared by Emerging Practives First consulting Group, 2004. pp. 1-18.

"Visa Introduces Next Generation B2B Payment Service" downloaded on www.corporate.visa.com/md/nr/press136.jsp, Feb. 2, 2007, pp. 1-3.

"Visa USA Small Business & Merchants, Visa ePay—How it Works" downloaded on www.usa.visa.com/business/accepting_visa/payment_technologies/epay_how_it_works.html, Feb. 2, 2007, p. 1.

"Visa USA Small Business & Merchants, Visa epay—Participating Financial Institutes" downloaded on www.usa.visa.com/business/accepting_visa/payment_technologies/epay_fi.html, at Feb. 2, 2007, p. 1.

"Visa ePay" downloaded on www.usa.visa.com/business/accepting_visa/payment_technologies/epay.html, Feb. 2, 2007, p. 1.

"Welcome to American Express Healthpay Plus Works, What is Pay Plus" downloaded on www.152.americanexpress.com/entcampweb/payment_technologies/epay_how_it_works.jsp, Feb. 2, 2007, pp. 1-2.

"Visa USA Small Business & marchants, Visa ePay—Credit counseling Automation" downloaded on www.usa.visa.com/business/accepting_visa/payment_technologies/epay_credit_counseling.html, Feb. 2, 2007, pp. 1-3.

"Visa Introduces Next Generation B2Bpayment Service" downloaded on www.sellitontheweb.com/ezine/news0569.shtml, Feb. 2, 2007, pp. 1-4.

"Welcome to American Express Healthpay Plus(SM)", What is HealthPay Plus downloaded on www.152.americanexpress.com/entcampweb/whatishealthpayplus.jsp at Feb. 2, 2007, pp. 1-5.

Supplementary European Search Report for EP 06717481.

International Search Report for PCT/US2006/00288.

Supplementary European Search Report for EP 06717470.

International Search Report for PCT/US2006/00274.

Supplementary European Search Report for EP 06717482.

International Search Report for PCT/US2007/70780.

Supplementary European Search Report for European Patent Application EP 07798894.

Recal Introduces WebSentry Reducing the Risk of Fraud for Internet Transactions; WebSentry Offers System Integrators Cost Effective SET Compliance for E-Commerce—Canadian Corporation News May 26, 1999.

* cited by examiner

SYSTEM AND METHOD USING EXTENDED AUTHORIZATION HOLD PERIOD

CROSS-REFERENCES TO RELATED APPLICATIONS

The instant nonprovisional patent application claims priority to U.S. Provisional Patent Application No. 60/812,266, filed Jun. 8, 2006, which is incorporated by reference herein for all purposes.

BACKGROUND OF THE INVENTION

One of the new trends in health insurance is the emergence of high deductible health plans. As employers try to control year-over-year increases in providing their employees with a health insurance benefit, many small and medium-size companies are turning to health plans with higher deductible amounts. Deductibles of $1,000 for individual coverage and $2,000 for family coverage are typical of high deductible plans.

To fill the deductible gap, some employers will fund a portion of the deductible amount through an Internal Revenue Service (IRS) approved Health Reimbursement Arrangement (HRA) or Health Savings Account (HSA). With HSAs, employees can also contribute funds up to the annual amount limits as defined by the IRS (if the plan meets IRS requirements for a high deductible plan).

A growing challenge for healthcare providers (doctors, hospitals, pharmacies) is to ensure that they receive payment from their patients who may not be eligible for health insurance plan reimbursement until the plan deductible is met. Currently, however, a healthcare provider (for example, a doctor) does not know at the time of service what portion of the doctor's bill for services will be the patient's responsibility and what portion will be paid by a payer, typically a health insurance company. In fact, it is typically only after the patient's visit that the amount for which the patient is responsible is determined.

The amount for which the patient is responsible, is determined by the doctor and the payer in what is called an "adjudication". The adjudication process can be a function of one or more factors, examples of which include the patient's current health plan coverage, services performed by the provider, contracted rates between the doctor and the payer, and the patient's current accumulated deductible.

The result is paperwork, administrative expense, and a long collection cycle. If the patient chooses not to pay, the expense incurred by the provider to collect payment from the patient may be so great that the provider simply elects to write off the uncollected amount.

Accordingly, there is a need in the art for methods and systems of processing healthcare claims that serve to assure healthcare providers of receiving payment for services rendered. Embodiments of the invention address this and other problems.

BRIEF SUMMARY OF THE INVENTION

Embodiments of the present invention relate to methods and apparatuses serving to provide assurance that healthcare providers will receive payment for services rendered. In one embodiment, a payment card (or other portable consumer device) provides an extended authorization hold period (for example up to 21 days). This hold period allows the healthcare provider to request authorization for payment from the patient's payment card, which can be a healthcare reimbursement card (Flexible Spending Account (FSA), HRA, or HSA card) or other general or limited purpose credit or debit card, submit the insurance claim for adjudication, and then upon receipt of the payer's Explanation of Benefits (EOB) within the hold period, submit for settlement only that amount actually due from the patient. In accordance with an alternative embodiment, pending receipt of the EOB from the insurer, the healthcare provider flags a transaction in a point-of-sale (POS) terminal device or other computer or server for storage and delayed submittal over an electronic payment network. Embodiments in accordance with the present invention are particularly applicable to payment of claims in healthcare plans following adjudication by a payer.

One embodiment of the invention is directed to a method comprising, sending an authorization request message to an issuer for an amount associated with payment for services rendered to a patient, wherein at least a portion of the amount is held for a predetermined amount of time; and sending a settlement request message to the issuer, wherein the settlement request message requests payment for an amount due by the patient after communicating with the patient's health insurance carrier (the payer).

Another embodiment of the invention is directed to a computer readable medium comprising code for performing the method described above, and a POS (point of service) terminal comprising the computer readable medium.

Still another embodiment in accordance with the present invention relates to a process wherein a consumer gives the provider permission to store the cardholder's payment card information for a predetermined amount of time, for the purpose of submitting an authorization request for the amount owed by the patient determined upon receipt of the payer's EOB.

These and other embodiments are described in further detail below.

DETAILED DESCRIPTION

Embodiments of the present invention relate to methods and apparatuses serving to provide assurance that healthcare providers will receive payment for services rendered. In one embodiment, a payment card (or other portable consumer device) provides an extended authorization hold period (for example up to 21 days). This hold period allows the healthcare provider to request authorization for payment from the patient's payment card (such as FSA, HRA, HSA general or limited purpose credit or debit payment card), submit the insurance claim for adjudication, and then upon receipt of the payer's Explanation of Benefits (EOB) within the hold period, submit for settlement only that amount actually due from the patient. In accordance with an alternative embodiment, pending receipt of the EOB from the insurer, the healthcare provider flags a transaction in a point-of-sale (POS) terminal device or computer server for storage and delayed submittal over an electronic payment network. Embodiments in accordance with the present invention are particularly applicable to payment of claims in healthcare plans following payer adjudication.

Figure 1:
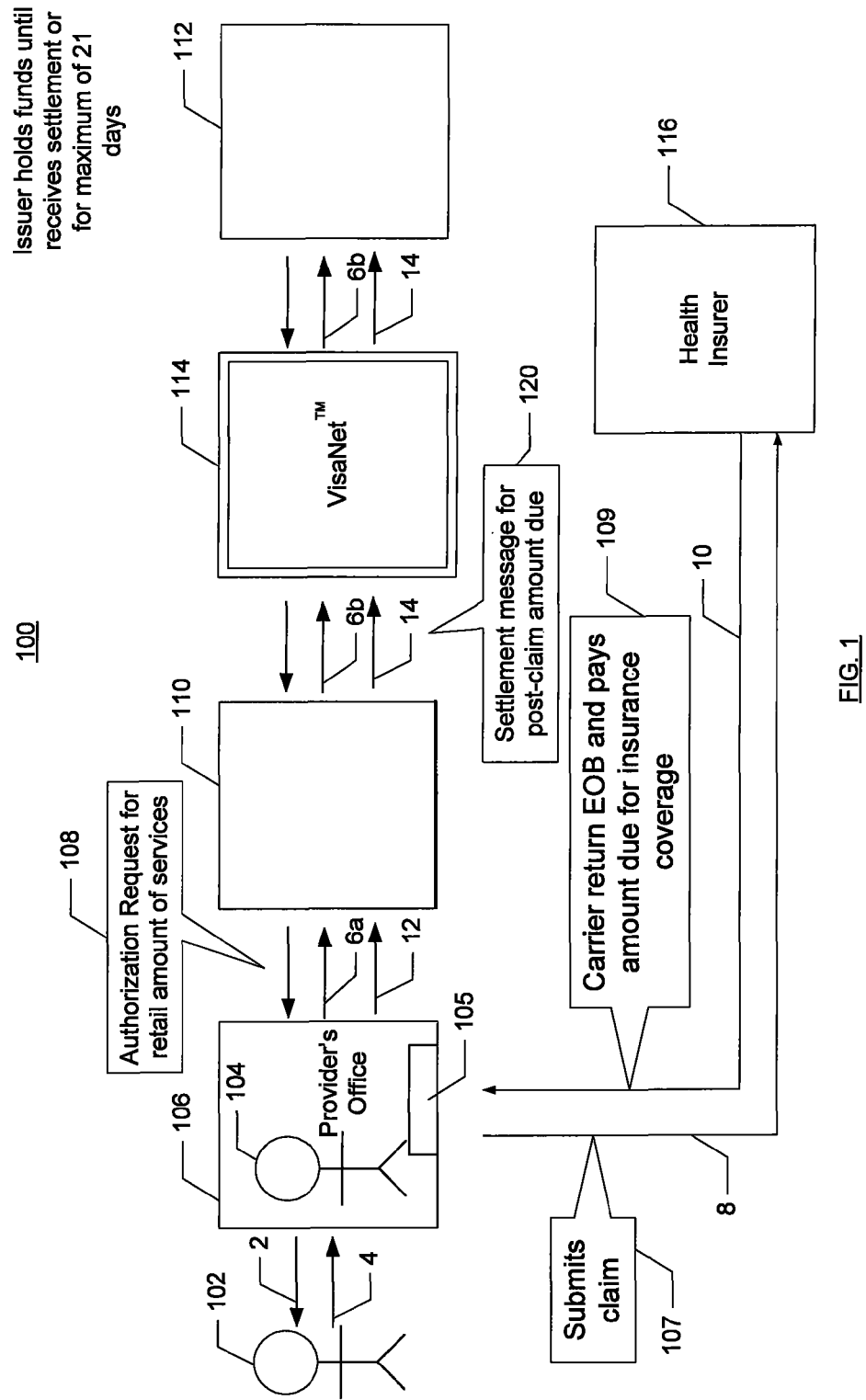
FIG. 1 shows a system according to an embodiment of the invention.
Figure 1A:
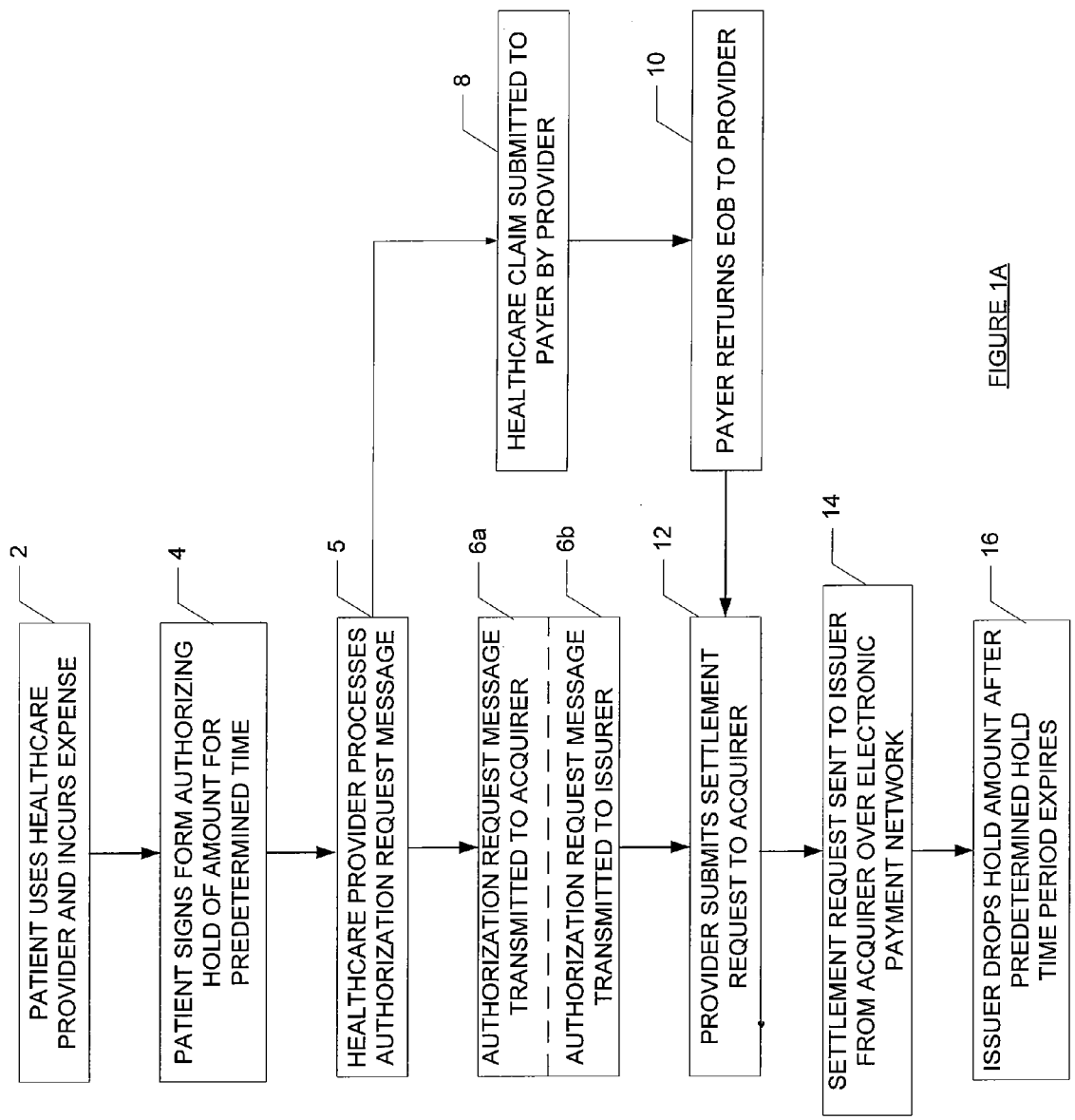
FIG. 1A shows a simplified diagram of the flow of steps for processing a healthcare claim according to an embodiment of the present invention.

FIG. 1 is a system level diagram which illustrates an embodiment of a system 100 for use in payment of healthcare claims in accordance with an embodiment of the present invention. FIG. 1A is a simplified flow diagram describing an exemplary process flow according to an embodiment of the invention, with reference to the system of FIG. 1.

In a step 2, patient 102 visits his healthcare provider 104 and incurs an expense for services provided. In step 4 (which may occur before or after the step 2 described above), the patient 102 indicates that the healthcare provider 104 may authorize his payment card account for the services provided and hold the amount for a predetermined time (for example up to 21 days) while the health insurance claim is processed. For example, the patient 102 may sign a form that authorizes a hold or may fill in an electronic form that authorizes a hold. During the predetermined time, the patient 102 will be unable to use the amount that is being held. For example, the patient's credit card limit or healthcare account spending limit may be $1000, and the authorization request message may request a hold of $400 for 21 days. The $400 may be considered an example of a first amount. During the 21 day hold period, the patient will not be able to use the credit card or healthcare spending card to make purchases in excess of $600. Although a 21 day hold period is used in this example, it is understood that other hold periods (e.g., 4 day, 7 day, 10 day, 30 day, or 60 day or longer) may be used in other embodiments.

The healthcare provider's office 106 (e.g., a doctor's office) accepts the patient's Visa® payment card (FSA, HRA, HAS, general purpose or limited purpose credit or debit card and in step 5 processes an authorization request message 108 associated with the retail price (non-discounted) of the healthcare services rendered.

Although in this example a portable consumer device such as a payment card, including an FSA/HRA/HSA or general purpose or limited purpose credit or debit card is described in detail, it is not necessary in embodiments of the invention. For example, the patient 102 and/or provider 104 could simply log into a terminal and the patient 102 may be authenticated to a remote server, and may thereafter process an authorization request message without the use of a portable consumer device such as a payment card. In another example, a pure healthcare spending card may be used, or a pure payment card (e.g., a debit, credit, or stored value card) could be used.

Regardless of whether or not a payment card is used to initiate the authorization request message, as shown in FIG. 1, in step 6a this authorization request message is first transmitted from point-of-sale (POS) (i.e. the POS terminal itself or computer server in communication therewith) 105 in the office 106 of healthcare provider 104, to acquirer 110 of the healthcare provider, which is typically its financial institution. In step 6b, the authorization request message is transmitted from acquirer 110 to issuer 112 (typically the financial institution of the patient) over an electronic payment processing network 114. The issuer 112 and/or the acquirer 110 may each have a server computer which is capable of transmitting and/or processing the authorization request message. A server may be single computer apparatus or cluster of computer apparatuses functioning together to service the requests of one or more other computer apparatuses. A typical server computer may include many of the components shown FIG. 4A (described below with respect to a point of service terminal). In the specific example illustrated in FIG. 1, the electronic payment processing network comprises the VisaNet® network administered by Visa®. However, the present invention is not limited to this particular embodiment, and other electronic payment processing networks could alternative be utilized.

Separately, in step 8 (e.g., before or after the authorization request message is sent from the provider's office 106) the provider's office 106 submits a claim 107 to the health insurance carrier (payer) 116 on behalf of the patient 102, following the provider's usual procedures. The content and format of the healthcare claim 107 submitted in step 8, is also governed by §837 of the Health Insurance Portability and Accountability Act (HIPAA). Enacted in 1996, HIPAA sets forth requirements governing security and privacy of healthcare data.

Upon receipt of the healthcare claim, the payer 116 reviews it for eligibility for payment under existing agreements with the patient 102 and with the healthcare provider 106. Based upon the results of this review, in step 10, the payer 116 returns to healthcare provider 104 an Explanation of Benefits (EOB) 109, indicating the amount to be paid (if any) by payer 116 for the medical services or products rendered to the patient by the healthcare provider. The EOB 109 may be sent to the provider's office 106 in an electronic manner as shown, or may be sent to the provider's office 106 as a paper document in the mail. The content and format of the EOB transmitted in step 10, is governed by §835 of HIPAA.

Upon receipt of the insurer's EOB, in step 12 the provider's office 106 submits a settlement request 120 to its acquirer 110 for the amount due from the patient 102. In step 14, the settlement request is forwarded from acquirer 114 to the issuer 112 over an electronic payment network 114. The monetary amount of the settlement request could be the price for the healthcare services as originally submitted by the provider's office 106. More likely however, the request for settlement due from the patient 102 is for a lesser amount, reflecting the discounted price of services as agreed to by the patient's insurance plan, less the amount agreed to be covered by the insurer.

Illustratively, with respect to the specific example described above, the provider may have requested a $400 hold on the patient's credit card account to pay for the patient's medical services. The contracted price agreed to by the payer and provider for services performed may have also cost $400. The EOB received by the provider may indicate that the insurer will only pay $100 for the services. The provider may then submit a settlement request in the amount of $300 (an example of a second amount) to the issuer after reviewing the EOB or adjudication. The $300 may then be deducted from the patient's healthcare spending account or other account, and the $100 that was previously held is released.

Alternatively, if the provider 104 has not submitted the final settlement amount by the end of the predetermined hold time period (for example, the $21^{st}$ day), in step 16 the payment card issuer 112 would drop the hold amount, and these funds would again be available for use by patient 102. In such an event, the healthcare provider's office 106 could submit a request for settlement after the predetermined hold time period has expired, but would not have the same assurance of receiving payment as if the request for settlement was submitted during the predetermined hold time period.

Figure 2:
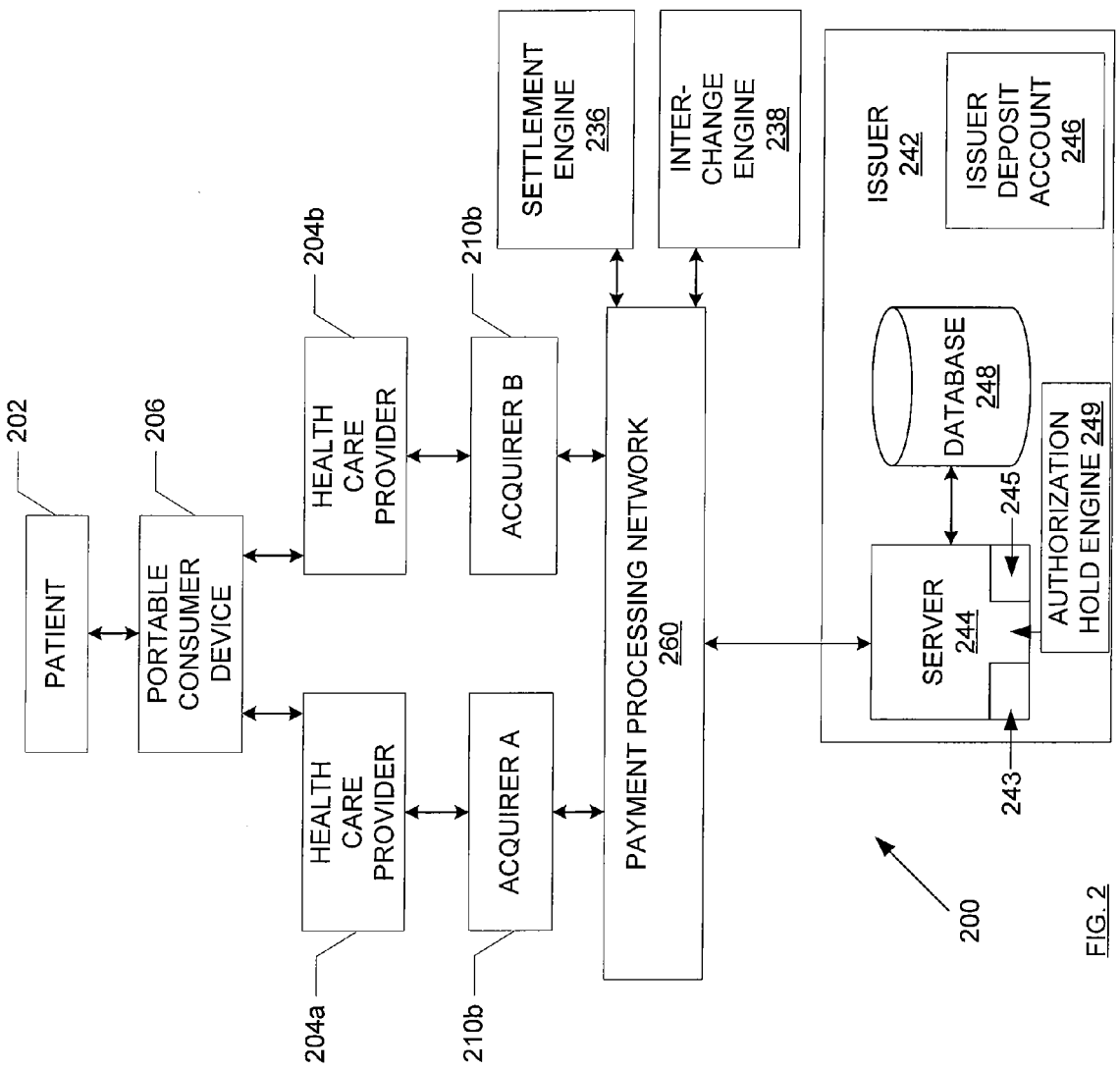
FIG. 2 shows a simplified box diagram showing elements of a healthcare payment processing system in accordance with an alternative embodiment of the present invention.

FIG. 2 shows a system 200 that can be used in an embodiment of the invention. The system 200 includes healthcare providers 204(a), 204(b) and respective acquirers 210(a), 210(b) associated with those healthcare providers 204(a), 204(b). A patient 202 may receive healthcare services or goods at the healthcare providers 204(a), 204(b) using a portable consumer device 206, for example a magnetic stripe credit, debit, FSA, HRA, or HSA card. The acquirers 204(a), 204(b) can communicate with an issuer 208 via a payment processing network 260, such as VisaNet®. The payment processing network 260 may communicate with an interchange engine 238. Although the issuer 242 and acquirers 210(a), 210(b) are shown as separate blocks in this diagram, in accordance with particular embodiments of the present invention, a single entity may embody both the issuer and acquirer (e.g., Discover®). Also, an "issuer" may include any suitable financial institution (e.g., a bank) which may issue a payment token such as a portable consumer device to the patient. The acquirer may also be a financial institution such as a bank, or other company approved to provide merchant processing services.

The portable consumer devices 206 according to embodiments of the invention may be in any suitable form. For example, the portable consumer devices can be hand-held and compact so that they can fit into a consumer's wallet and/or pocket (e.g., pocket-sized). For example, the portable consumer devices may include smart cards (with a microprocessor), ordinary credit or debit cards (with a magnetic strip and without a microprocessor), a keychain device etc. Other examples of portable consumer devices include cellular phones, personal digital assistants (PDAs), pagers, payment cards, security cards, access cards, smart media, transponders, and the like. The portable consumer devices 206 can also be debit devices (e.g., a debit card), credit devices (e.g., a credit card), or prepaid or stored value devices (e.g., a prepaid card or stored value card). In some embodiments, the portable consumer devices 206 may be re-writeable so that values associated with the portable consumer devices 206 are stored on them. In other embodiments, the values associated with the portable consumer devices may be stored at a server operated by or at an issuer.

The payment processing network 260 may include data processing subsystems, networks, and operations used to support and deliver authorization services, exception file services, and clearing and settlement services. An exemplary payment processing network may include VisaNet®. Payment processing networks such as VisaNet® are able to process credit card transactions, debit card transactions, and other types of commercial transactions. VisaNet®, in particular, includes a VIP system (Visa Integrated Payments system) which processes authorization requests and a Base 11 system which performs clearing and settlement services.

The payment processing network 260 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing network 260 may use any suitable wired or wireless network, including the Internet.

The healthcare provider locations 204(a), 204(b) also have physical point of sale (POS) terminals or a virtual point-of-sale terminals via desk-top PC applications (not shown in FIG. 2) that can interact with the portable consumer devices 206. Any suitable point of sale terminal may be used including card readers. The card readers may include any suitable contact or contactless mode of operation. For example, exemplary card readers can include RF (radio frequency) antennas, magnetic stripe readers as part of a point-of-sale terminals, or "wedge" devices connected to desk-top PCs, etc. to interact with the portable consumer devices 206.

Settlement engine 236 and interchange engine 238 are shown in the particular embodiment of FIG. 2. Authorization hold engine 249 serves to determine whether a particular authorization request message transmitted over the electronic payment network is eligible for a delay in authorization according to an embodiment of the present invention. This task may be performed with reference to one or more particular fields (for example the eligible MCC code discussed in detail below) present in the authorization request message, a rule set, and information stored in a database. The interchange engine 238 may be used to calculate interchange fees or perform other interchange related functions.

Various other software engines may also be included in the system to perform the methods according to embodiments of the invention. Such software engines can be accessible to the issuer 242, payment processing network 260, or the acquirers 210a, 210b. Although the interchange engine 238 is shown as being directly accessible to the payment processing network 260, alternatively it may be directly accessible to the acquirers 210a, 210b or the issuer 242.

The interchange engine 238 may perform interchange processing (as described above). The settlement engine 236 may perform settlement of authorized transactions between the issuer and the acquirer. The authorization hold engine 249 may contain or store the various instructions and rule sets to recognize an authorization request for a healthcare payment involving a delay period in accordance with an embodiment of the present invention.

The engines 236, 238, and 249 and any other software components or functions described in this application, may be implemented as software code to be executed by a processor using any suitable computer language such as, for example, Java, C++ or Perl using, for example, conventional or object-oriented techniques. For example, any of the specific steps (or combination of steps) shown in FIG. 3A of an embodiment of the present application may be embodied as computer code on a computer readable medium in any suitable combination. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

As shown in FIG. 2, issuer 242 may include an issuer deposit account 246. Issuer 242 may further include a host computer or server 244 including a computer readable storage medium 243 and a processor 245. Server 244 is in electronic communication with a database 248 configured to store information pertaining to a financial account of a patient.

In accordance with certain embodiments of the present invention, the computer-readable storage medium 243 of the host computer may have code stored thereon to direct the processor 245 to perform certain tasks. For example, code stored on the computer readable storage medium may direct the processor to recognize an incoming authorization request, flag that authorization request, and delay settlement for the predetermined hold period.

Modify Payment Organization Operating Regulations

Operating regulations for a payment organization (e.g., Visa®) can be changed or modified to permit an extended authorization hold period for defined types of payment cards, for example FSA/HRA/HSA cards, based on the following criteria:

A healthcare provider qualifies under one of many specified Merchant Category Codes (MCCs). Eligible MCCs would include medical providers whose services are typically covered by health insurance, such as physicians, hospitals, medical laboratories, and other medical providers as defined.

Specify the requirements for the above-described patient authorization hold form.

Specify the requirements of participating healthcare providers.

Specify that the settlement amount can be different than the authorization amount.

Define the predetermined period of time within which a healthcare provider submits a settlement transaction.

The particular embodiment in accordance with the present invention described above is effective to help ensure that a healthcare provider is paid for services rendered. However, other considerations and/or issues relating to the above-described authorization and hold process are listed below.

Terminal Print Sales Receipt with Authorization and Hold Approval

In accordance with specific embodiments, POS terminals could be programmed to generate a transaction sales receipt that includes patient acknowledgement of the extended hold period while the provider's office determines the insurer's coverage amounts, if any. With this capability, all parties (the patient/cardholder and provider's office) will have documentation of the agreed upon hold period.

Healthcare Provider POS System Capabilities

The methods and systems for payment of healthcare claims described above in connection with FIGS. 1-1A are exemplary only, and variations may be employed and remain within the scope of the present invention. For example, while the particular embodiment described above involves implementing a predetermined delay period between a time of sending an authorization request and a request for settlement, this is not required by the present invention.

For example, POS terminals in healthcare provider offices today may be older device models, perhaps with only basic capabilities. This is especially felt to be the case in smaller physician practices. However, larger group practices and hospitals are more likely to have newer, more advanced POS devices featuring memory and transaction search/flagging capabilities.

Figure 3:
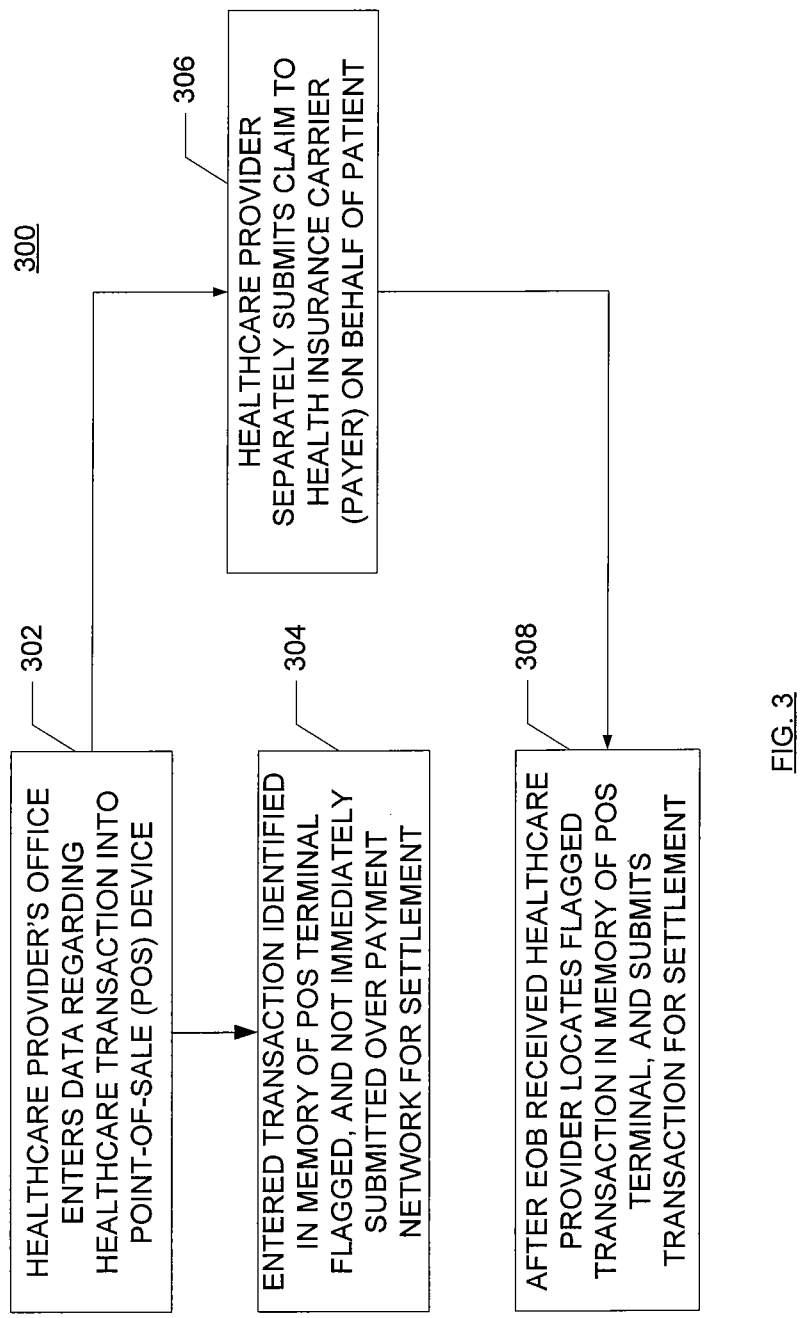
FIG. 3 shows a simplified diagram of the flow of steps for processing a healthcare claim according to an alternative embodiment in accordance with the present invention.

Therefore, in accordance with an alternative embodiment of the present invention, a predetermined delay period may be implemented between a time of entering data for a transaction into a POS device of a healthcare provider, and a subsequent time of actually sending the transaction data over a payment network for settlement. FIG. 3 provides a simplified diagram of a flow 300 of steps for processing payment of a healthcare claim in accordance with such an alternative embodiment of the present invention.

As shown in FIG. 3, to complete a transaction in accordance with such an alternative embodiment, in step 302 the healthcare provider's office would enter in the data regarding the transaction into the POS device to authorize the payment using standard procedures. However, rather than submitting the transaction for settlement right away, in step 304 the transaction would be identified in the memory of the POS terminal and flagged, such that it should not immediately be submitted over the payment network for settlement.

As with the original embodiment shown and described in connection with FIGS. 1-1A, in step 306 the provider's office separately submits a claim to the health insurance carrier (payer) on behalf of the patient, following the carrier's usual procedures. The content and format of the healthcare claim submitted in step 306, is also governed by §837 of the Health Insurance Portability and Accountability Act (H IPM).

In step 308, after the EOB is received for the processed claim, the office staff of the healthcare provider would locate the pending flagged authorization transaction in the memory of the POS terminal, and submit that transaction for settlement with the same or a corrected/revised amount. Again, the amount for settlement could be the discounted price of services as agreed to by the patient's insurance plan, less the amount covered by the insurer.

The above description represents only one possible alternative embodiment in accordance with the present invention. Other variations are possible. For example, while the specific embodiment of FIG. 3 indicates that upon receipt of the EOB from the insurer, the office staff of the healthcare provider are required to manually identify the flagged message and then take affirmative steps to submit the request for authorization of the transaction over the electronic payment network. However, in accordance with alternative embodiments of the present invention, this process could occur without human intervention, with the POS terminal device being programmed to automatically submit a request for authorization of flagged transactions, once a predetermined delay or hold period has elapsed.

There may be other considerations and/or issues relating to the above-described alternative embodiment. One advantage to the alternative embodiment shown in FIG. 3 is that the patient's financial account is not encumbered during part or all of a predetermined hold period. As no request for settlement has been submitted, the available balance in the patients' debit account, or the available line of credit for the patient's credit account, remain unaffected until an EOB from the payer has been received by the heathcare provider, and settlement actually occurs.

One potential difficulty for implementing the alternative embodiment described in FIG. 3, is that the standard POS terminals in the offices of some healthcare providers are not set up to easily accommodate withholding a transaction from settlement. A POS terminal device having capabilities for storing transactions and submitting same for payment is represented generically in the drawing of FIG. 4.

Figure 4:
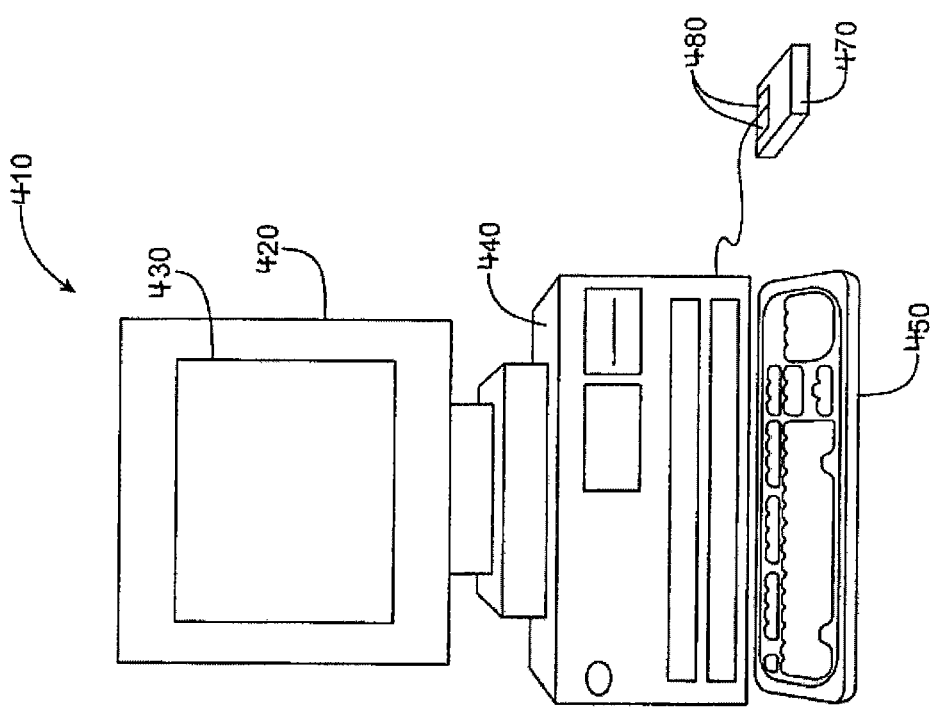
FIG. 4 is a schematic illustration of a computer system for use in accordance with embodiments of the present invention.

FIG. 4 shows computer system 410 including display device 420, display screen 430, cabinet 440, keyboard 450, and mouse 470. Mouse 470 and keyboard 450 are representative "user input devices." Mouse 470 includes buttons 480 for selection of buttons on a graphical user interface device. Other examples of user input devices are a touch screen, light pen, track ball, data glove, microphone, and so forth. FIG. 4 is representative of but one type of system for embodying the present invention. It will be readily apparent to one of ordinary skill in the art that many system types and configurations are suitable for use in conjunction with the present invention. In a preferred embodiment, computer system 410 includes a Pentium class based computer, running Windows NT operating system by Microsoft Corporation. However, the apparatus is easily adapted to other operating systems and architectures by those of ordinary skill in the art without departing from the scope of the present invention.

As noted, mouse 470 can have one or more buttons such as buttons 480. Cabinet 440 houses familiar computer components such as disk drives, a processor, storage device, etc. Storage devices include, but are not limited to, disk drives, magnetic tape, solid state memory, bubble memory, etc. Cabinet 440 can include additional hardware such as input/output (I/O) interface cards for connecting computer system 410 to external devices external storage, other computers or additional peripherals, further described below.

Figure 4A:
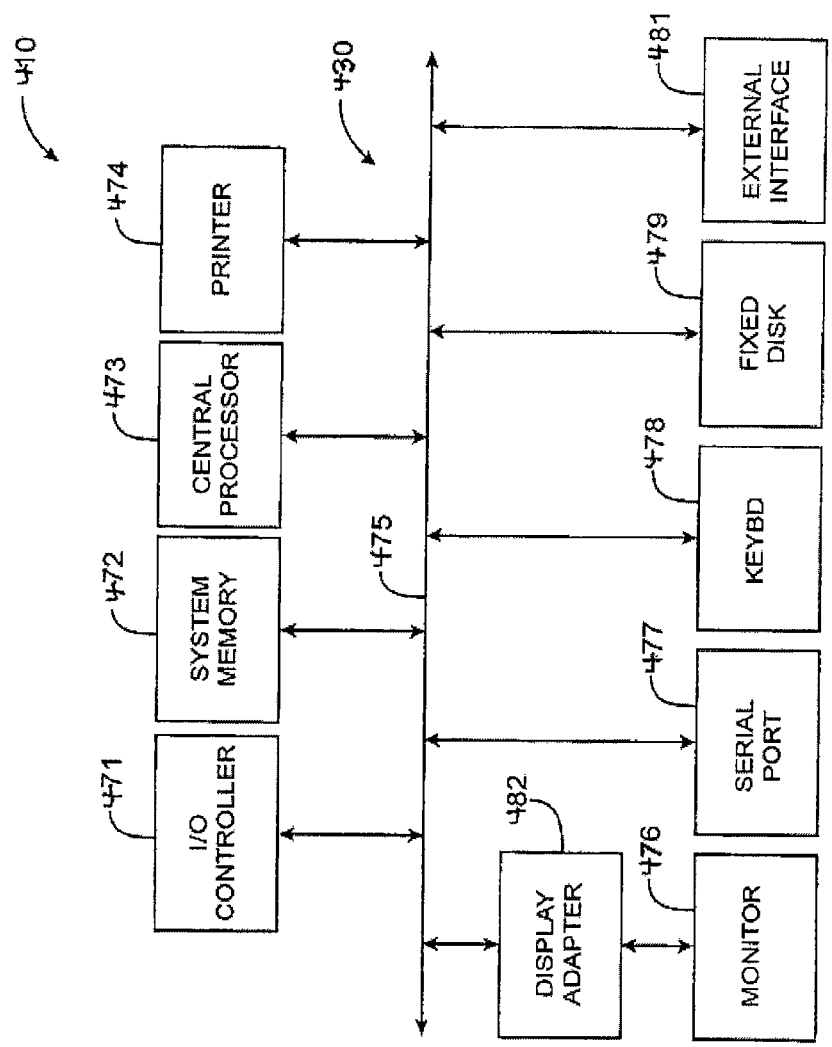
FIG. 4A is an illustration of basic subsystems the computer system of FIG. 4.

FIG. 4A is an illustration of basic subsystems in computer system 410 of FIG. 4. This diagram is merely an illustration and should not limit the scope of the claims herein. One of ordinary skill in the art will recognize other variations, modifications, and alternatives. In certain embodiments, the subsystems are interconnected via a system bus 475. Additional subsystems such as a printer 474, keyboard 478, fixed disk 479, monitor 476, which is coupled to display adapter 482, and others are shown. Peripherals and input/output (I/O) devices, which couple to I/O controller 471, can be connected to the computer system by any number of means known in the art, such as serial port 477. For example, serial port 477 can be used to connect the computer system to a modem 481, which in turn connects to a wide area network such as the Internet, a mouse input device, or a scanner. The interconnection via system bus allows central processor 473 to communicate with each subsystem and to control the execution of instructions from system memory 472 or the fixed disk 479, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

To implement the alternative embodiment in accordance with the present invention described above in FIG. 3, POS terminal lodging applications stored in the computer readable storage medium of the computer system of the POS terminal device, could be used. Lodging applications are conventionally used in the hotel industry to hold funds for payment while a guest is staying at a hotel. The holding of such funds is known to those of ordinary skill in the art. These capabilities include the specification of the customer's expected length of stay, the room rate, and an allowance for other miscellaneous charges during the customer's stay at the hotel.

A basic approach for the process could be incorporated into lodging applications as follows:

Folio number. The provider's office inputs a patient number at the time of entering the transaction into the POS device. This number can be referenced to determine whether a delay in requesting authorization is appropriate.

Check-in date. The date that patient is in the office for services. This date can be referenced to determine the date from which any delay in requesting authorization should be commenced.

Number of days in stay. This field, which is typically utilized for lodging services, could also be used to indicate that a delay in authorization is appropriate. For example, a 0 or 1 may mean immediate settlement, such as would be the case of an insurance co-payment for which no adjudication is necessary. Entry of a particular number (for example '21") would indicate a hold transaction.

Check-out date: The date that the authorization hold is released for settlement.

Amount due: The final amount owed by the patient after the provider's office receives the insurer's EOB. This amount is sent by the terminal to the acquirer for clearing and settlement.

The POS device terminal could include a function providing an alert (i.e. an audio and/or visual cue) to a user on the date that a predetermined number of days have passed since the date the transaction was entered. Receipt of such an alert could trigger the user to submit the transaction for authorization notwithstanding the delayed EOB from the payer. Receipt of such an alert could also trigger the user to send an inquiry to the payer regarding the state of processing of the healthcare claim, and a notification to the patient that the transaction was processed.

Other details of embodiments of the invention can be found in the following U.S. Provisional Patent Applications, which are all herein incorporated by reference in their entirety for all purposes: 60/641,483, filed on Jan. 4, 2005; 60/641,597, filed on Jan. 4, 2005; and 60/641,464 filed on Jan. 4, 2005.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Incorporated by reference herein for all purposes are the following U.S. Nonprovisional Patent Applications: Ser. No. 10/418,989, filed Apr. 18, 2003 and entitled "SYSTEM AND METHOD FOR PAYMENT OF MEDICAL CLAIMS"; Ser. No. 11/231,026, filed Sep. 20, 2005 and entitled "METHOD FOR ENCODING MESSAGES BETWEEN TWO DEVICES FOR TRANSMISSION OVER STANDARD ONLINE PAYMENT NETWORKS"; Ser. No. 11/230,761, filed Sep. 20, 2005 and entitled "AUTO SUBSTANTIATION FOR OVER-THE-COUNTER TRANSACTIONS"; and Ser. No. 11/230,743, filed Sep. 20, 2005 and entitled "METHOD AND SYSTEM FOR DETERMINING HEALTHCARE ELIGIBILITY".

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An electronic payment processing method comprising:
receiving, an authorization request data message from a point of sale terminal at a healthcare provider via an electronic payment processing network, for a first amount associated with healthcare services rendered to a patient;
determining, by the electronic payment processing network, a predetermined amount of time for holding the portion of the first amount on a payment card from a plurality of amounts of time, from the authorization request data message;
forwarding, via the electronic payment processing network the authorization request data message to an issuer of the payment card,
the authorization request data message having a requirement that at least a portion of the first amount is held by the issuer for the predetermined amount of time, the predetermined amount of time comprising at least four days;

receiving, from the point-of-sale terminal, a settlement request message, via the electronic payment processing network, requesting payment for a second amount due from the patient after an adjudication with the patient's health insurance carrier within the predetermined amount of time, wherein the issuer is not the health insurance carrier, and if the healthcare provider does not send the settlement request message to the issuer within the predetermined amount of time, the held amount is no longer held; and processing, via the electronic payment processing network, a fund transfer transaction from the patient's payment card to the health provider based on the settlement request message.

2. The method of claim 1 wherein the second amount comprises a difference between, a value of the healthcare services, or a contracted price for services agreed upon between the health insurance carrier and healthcare provider; and an amount to be paid by the health insurance carrier following the adjudication decision.

3. The method of claim 2 wherein the first amount comprises a retail value of the services rendered.

4. The method of claim 1 wherein the settlement request message is sent after a predetermined period of time in which the adjudication is expected to be made.

5. The method of claim 4 wherein the point-of-sale terminal sends an alert to the healthcare provider regarding an expiration of the predetermined time period.

6. The method of claim 1 wherein the predetermined amount of time comprises 21 days.

7. The method of claim 1 wherein the hold is automatically imposed by the point-of-sale terminal based upon recognition of information present in the authorization request message.

8. The method of claim 1 wherein the hold is maintained for only a predetermined period of time in which the adjudication is expected to be completed.

9. The method of claim 1 wherein the settlement request message is transmitted at the manual instruction of the healthcare provider.

10. The method of claim 1 wherein the payment card is selected from a group consisting of Flexible Savings Account card, Health Reimbursement Arrangement card, and Health Savings Account card.

11. An apparatus comprising a host computer including a processor and a non-transitory computer readable storage medium, the non-transitory computer readable storage medium having stored thereon code for directing the processor to, receive over an electronic payment network, a request for authorization of a payment of a transaction for healthcare services rendered to a patient the payment for a first amount, determine, a predetermined amount of time for holding the portion of the first amount on a payment card from a plurality of amounts of time, from the request for authorization;

recognize in the request for authorization, information indicating that a delay for the predetermined amount of time in settlement of the transaction is appropriate, generate a message delaying settlement of the transaction for a predetermined amount of time, wherein delaying comprises imposing a hold of at least a portion of the first amount for authorization, the hold comprising at least four days, receive over the electronic payment network, a settlement request for a payment of the transaction for healthcare services for a second amount due from the patient, and if the settlement request is not received within the predetermined amount of time, release the held amount, and process a fund transfer transaction of the second amount from the patient's payment card to a health provider based on the settlement request.

12. The apparatus of claim 11 wherein the host computer is controlled by an issuer of a payment card of the patient.

13. The apparatus of claim 11 wherein the computer readable storage medium has code thereon to further direct the processor to recognize a subsequent message requesting settlement of the transaction.

14. The apparatus of claim 11 wherein the request for authorization and the settlement request are received from an acquirer.

15. The apparatus of claim 11 wherein the information indicating that a delay in settlement of the transaction is appropriate comprises the predetermined amount of time.

16. The apparatus of claim 11 wherein the computer readable storage medium has code thereon to further direct the processor to send an alert regarding an expiration of the predetermined amount of time.

17. The apparatus of claim 11 wherein the payment of a transaction for healthcare services comprises a credit card transaction.

18. The apparatus of claim 11 wherein the predetermined amount of time comprises 21 days.

19. The apparatus of claim 11 further comprising an interchange engine configured to calculate interchange fees.

* * * * *